US005757903A

United States Patent [19]
Welter, Jr.

[11] Patent Number: 5,757,903
[45] Date of Patent: May 26, 1998

[54] FLEXIBLE DIRECT AND SHARED TERMINATION CALL PROCESSING

[75] Inventor: William G. Welter, Jr., Colorado Springs, Colo.

[73] Assignee: MCI Corporation, Washington, D.C.

[21] Appl. No.: 581,264

[22] Filed: Dec. 29, 1995

[51] Int. Cl.$^6$ ...................................................... H04M 3/42
[52] U.S. Cl. .......................... 379/229; 379/207; 379/220; 379/289
[58] Field of Search ..................... 379/207, 220, 379/221, 229, 201, 245, 246, 289

[56] References Cited

U.S. PATENT DOCUMENTS

| | | | |
|---|---|---|---|
| 4,191,860 | 3/1980 | Weber | 379/221 |
| 5,095,505 | 3/1992 | Finucane et al. | 379/201 |
| 5,226,075 | 7/1993 | Funk et al. | 379/221 |
| 5,422,941 | 6/1995 | Hasenauer et al. | 379/207 |
| 5,425,090 | 6/1995 | Orriss | 379/207 |
| 5,436,957 | 7/1995 | McConnell | 379/207 |

FOREIGN PATENT DOCUMENTS

| | | |
|---|---|---|
| 0 501 513 A2 | 9/1992 | European Pat. Off. . |
| 93/17515 | 9/1993 | WIPO . |
| 96/21989 | 7/1996 | WIPO . |

OTHER PUBLICATIONS

Atoui, "Virtual Private Network Call Processing in the Intelligent Network," *International Conference on Communications*, vol. 2, pp. 561-565, Jun. 1992.

Cronk et al., "DMS-100: the first major digital central office switch to offer Enhanced 911 service," *Telesis*, vol. 17, No. 91, pp. 49-59, Dec. 1990.

*Primary Examiner*—Ahmad F. Matar

[57] ABSTRACT

A method and apparatus for processing and routing termination telephone calls is disclosed. A termination telephone call is one that terminates at a specific pre-defined shared or specific pre-defined dedicated termination trunk group. The pre-defined trunk group is connected to a pre-defined termination switching device. A termination telephone number is translated into a termination routing address. The termination telephone call is routed via a telecommunications network to a termination switch as specified by the termination routing address. The call is then terminated to a dedicated or shared trunk group which is also specified by the termination routing address. The dedicated or shared termination trunk group is directly connected to the termination switch.

16 Claims, 5 Drawing Sheets

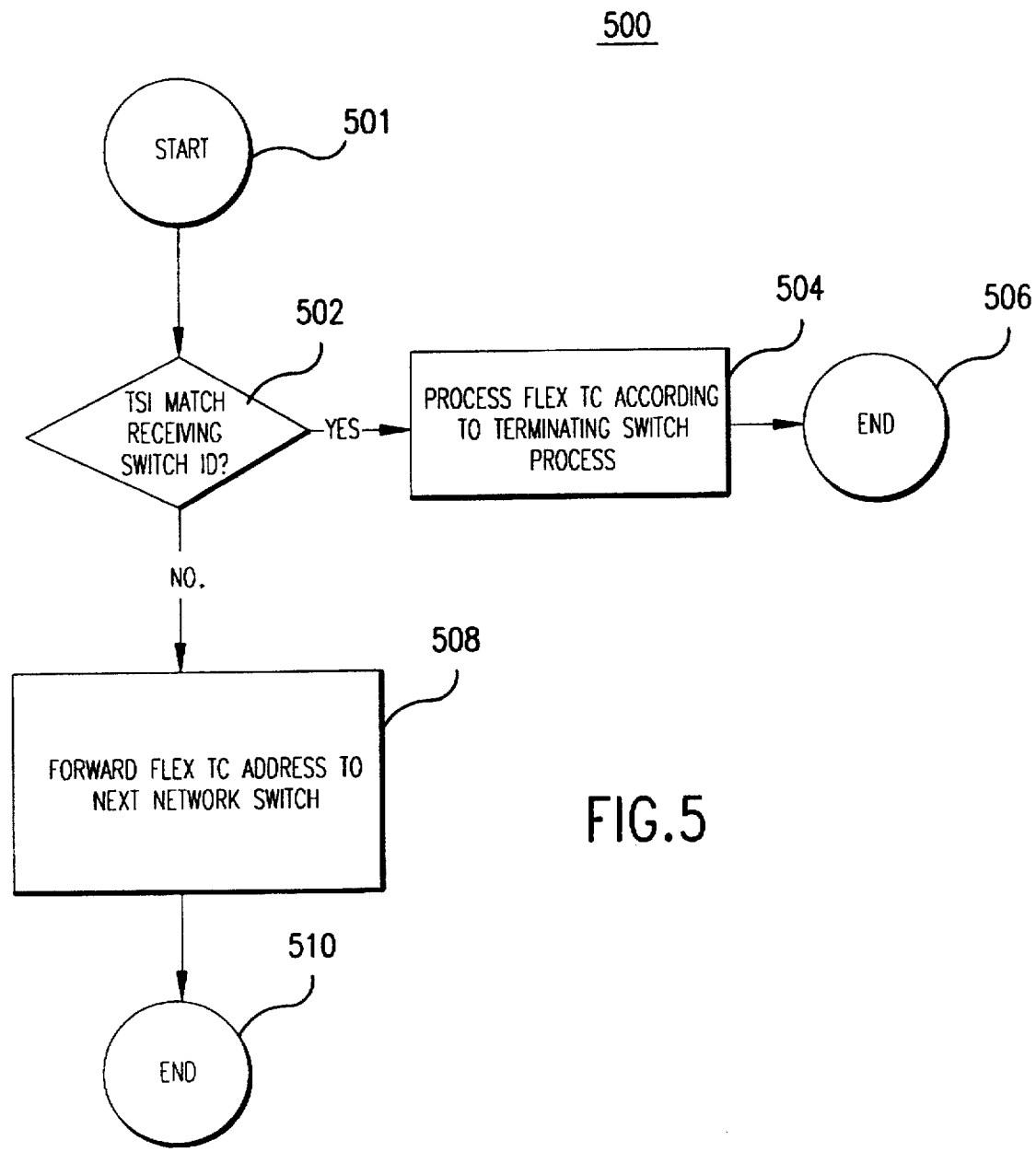

FLEXIBLE DIRECT AND SHARED TERMINATION CALL PROCESSING

BACKGROUND OF THE INVENTION

1. Field of the Invention

The present invention relates generally to telecommunications and more particularly to the processing and routing of telephone calls directed to specific termination switches and specific termination trunk groups within a telecommunications network.

2. Abbreviations

The following abbreviations or acronyms, used throughout this disclosure, have the meanings attributed to them below.

| | |
|---|---|
| ADF | Application Data Field |
| ARU | Audio Response Unit |
| DAL | Dedicated Access Line |
| DSID | Destination Switch ID |
| DTC | Direct Termination Call |
| EVS/NARS | Enhanced Voice Services/Network Audio Response System |
| FCSI | Forward Call Special Information |
| Flex DTC | Flexible Direct Termination Call |
| Flex STC | Flexible Shared Termination Call |
| Flex TC | Flexible Termination Call |
| IAM | Initial Address Message |
| IMT | Inter-machine Trunk |
| ISN | Integrated Services Network |
| ISUP | Integrated Services User Part |
| LATA | Local Access and Transport Area |
| LEC | Local Exchange Carrier |
| NCS | Network Control System |
| NOA | Nature of Address |
| NPA | Numbering Plan Area |
| PBX | Private Branch Exchange |
| RLT | Release Line Trunk |
| SAC | Service Access Code |
| SS7 | Signaling System 7 |
| STC | Shared Termination Call |
| TSI | Termination Switch Identifier |
| TSP | Telephone Service Provider |
| TTGI | Termination Trunk Group Identifier |

3. Related Art

The present invention relates to processing and routing of direct termination calls (DTCs) by a telecommunications company. A DTC is a telephone call routed to a particular telecommunications switch (the termination switch or terminating switch) and delivered to a particular dedicated access line directly connected to the terminating switch location. Routing information is contained in a DTC address which includes identifiers for both the dedicated access line and the termination switch.

A dedicated access line (DAL) is a transmission line that is dedicated for a particular customer's use. Customers that subscribe to DALs by service providers are hereinafter referred to as "subscribers". Unlike typical telephone network transmission lines, dedicated access lines are not shared with other telephone company customers but are strictly reserved for use by a subscriber. Some advantages that subscribers gain by using DALs include the availability of high speed data transmission lines and/or high quality voice transmission lines, and a high rate of transmission line availability. A dedicated access line is directly connected between a service provider's termination switch and a subscriber's termination device such as a private branch exchange (PBX).

Using conventional methods, a direct termination call is processed as follows. A DTC telephone number is dialed into the public switched telephone network. As used herein, a DTC telephone number is defined as any telephone number that is to be translated into a DTC destination address (described below). Also referred to as pre-translated telephone numbers, DTC telephone numbers may, for example, be in the form of international, national, private, or service access code (SAC) numbers. Once dialed into the public switched telephone network, a DTC telephone number is routed to the DTC provider's switching system. There, the DTC telephone number is translated into a DTC address. The DTC address contains termination routing information including a termination switch identifier (TSI), a termination trunk group identifier (TTGI), and a 7 or 10 digit number. The 7 or 10 digit number is to be outpulsed to the dedicated access line identified by a combination of the TTGI and the TSI.

Further call processing of DTCs occurs at the termination switch. Logic at the termination switch functions to determine the number of digits to outpulse to a subscriber's dedicated access line. Even though all (7 or 10) digits are transported to the termination switch, only a subset of those digits may actually be required by a particular subscriber. For example, a subscriber having a PBX with less than 1000 individual stations (i.e. telephones) connected thereto, may only require 3 digits. The delivery of 3 digits in this case, would be sufficient to uniquely identify each station connected to the PBX for ringing purposes and the like.

The number of digits to be delivered to a particular subscriber is specified in a data base which is accessed by the terminating switch. A number of digits parameter corresponding to the DAL's identifier (TTGI) as specified in the DTC address, is retrieved by the terminating switch. Finally, the entire 7 or 10 digit number or a subset thereof, according to the data base output, is outpulsed to the dedicated access line and thereby delivered to the subscriber's PBX.

There are several problems associated with the conventional method as described above. Using the conventional method, a subscriber is limited to receiving a fixed maximum of only 10 digits. It would be desirable to increase this number in order to meet the needs of customers that require more than 10 digits.

Another problem associated with the conventional method is that the translating switch transmits the entire (7 or 10 digit) number associated with the DTC address over the telephone network to the termination switch. All digits are transmitted for each DTC even though only a subset of the digits may be required at the terminating switch, as previously discussed. It would be desirable to minimize network throughput by enabling the translating switch to transmit only the digits that are required to be outpulsed by the termination switch.

An additional problem associated with the conventional method is related to the maintenance of each terminating switch data base. As described herein, a data base at the terminating switch specifies the number of digits to be outpulsed to each subscriber. Using conventional methods, changing this parameter is a manual process which takes place at each terminating switch. Such switches are scattered throughout the telephone network, which generally comprises a vast geographical area such as the United States. It would be desirable to store the information pertaining to all subscribers in a central data base so that updates and maintenance of the information contained therein can be achieved more efficiently.

Further, another problem associated with the conventional method is related to the process used to determine the

3 number of digits to be outpulsed to each subscriber. Under the conventional method, the same number of digits are outpulsed for every DTC that terminates at a particular trunk group. It would be desirable to have the ability to deliver a variable number of digits to a subscriber that is not based on the trunk group, but is instead based on the DTC telephone number. This would enable a subscriber to specify a different number of digits to be delivered for each DTC telephone number assigned.

Still further, another problem associated with the conventional method is that DTC call processing applies only to calls terminating at dedicated trunk groups. It would be desirable to apply the routing flexibility of DTC call processing to calls terminating at shared trunk groups as well. Conventional processing of calls terminating at shared trunk groups does not provide the capability to route such calls to particular shared trunk groups. Instead such calls are routed according to well known routing rules using various factors to determine the best route, such as shortest distance, transmission line availability, and current network traffic use.

SUMMARY OF THE INVENTION

The present invention relates to a method and apparatus for routing and processing telephone calls that terminate at pre-defined shared or pre-defined dedicated trunk groups connected to pre-defined switching systems. Such trunk groups and switching systems are specified in an address that includes pre-defined termination trunk group and switch identifiers. The address is derived via a process that uses a data base system that translates telephone numbers into termination call addresses. The translation process takes place by the receiving switching device in response to receiving a pre-defined termination telephone number which is designed to trigger the translation process.

Features and Advantages

The present invention improves upon conventional methods by increasing the efficiency of termination call processing and by adding flexibility and/or new and improved functions.

The present invention increases the flexibility of termination call processing by enabling a telecommunications service provider to outpulse more than 10 digits to a termination trunk group.

Additionally, the present invention decreases telephone network throughput by transmitting only the required number of digits that need to be outpulsed from the termination switch when processing direct termination calls. Additionally, the present invention increases the efficiency of maintaining and updating subscriber outpulse information data by using a centralized data base to access such information when processing direct termination calls.

Further, the present invention enhances DTC service offerings by providing subscribers with the ability to specify a number of digits to outpulse for each DTC telephone number assigned by the service provider.

Still further, the present invention increases the quality of service a telecommunications company can offer its customers by enabling calls that terminate at shared trunk groups to be routed to particular shared trunk groups to take advantage of particular qualities or characteristics of shared trunk groups.

Further features and advantages of the invention, as well as the structure and operation of various embodiments of the invention, are described in detail below with reference to the accompanying drawings

BRIEF DESCRIPTION OF THE FIGURES

The present invention will be described with reference to the accompanying drawings, wherein:

4

Figure 1:
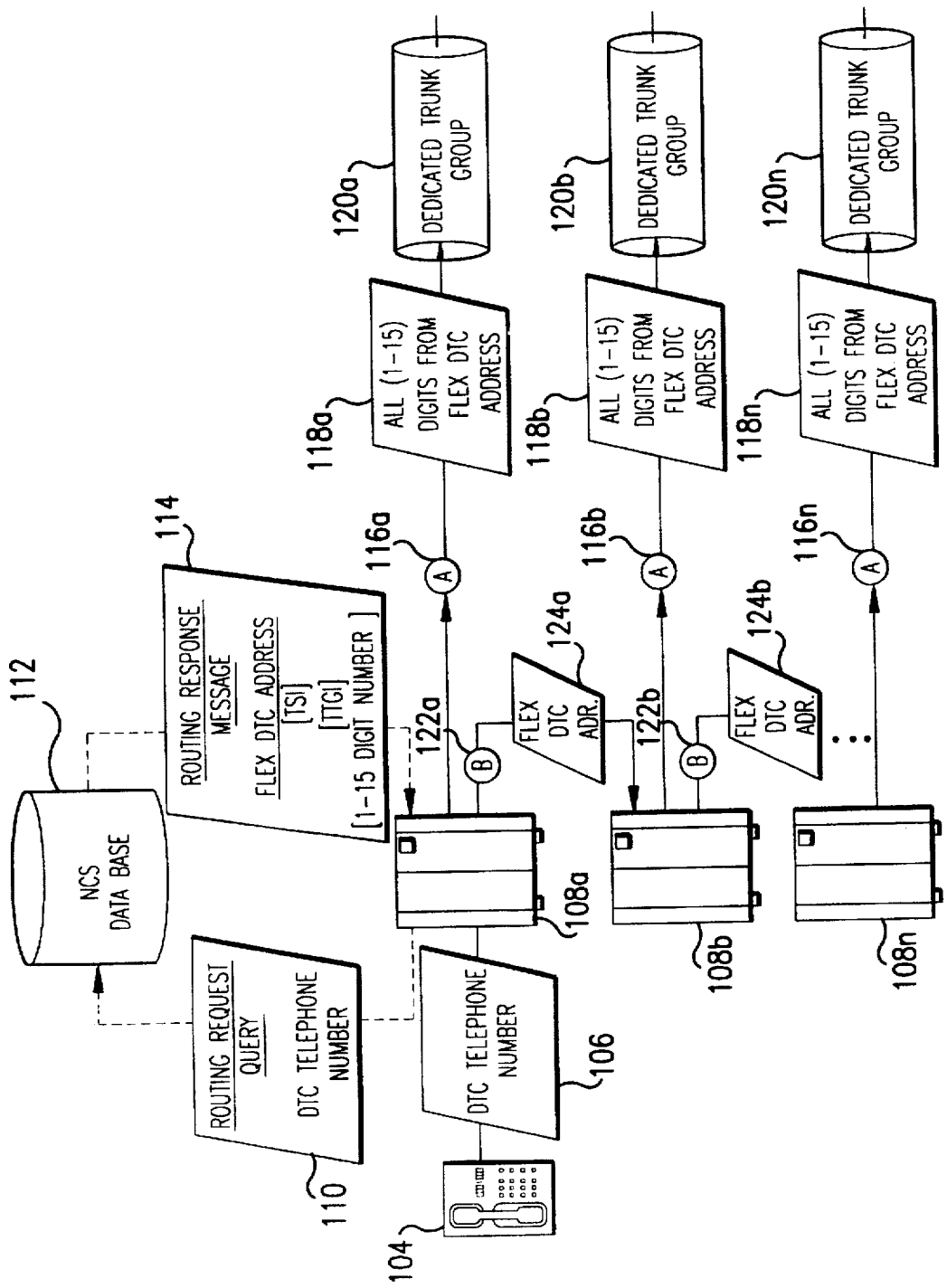
Figure 2:
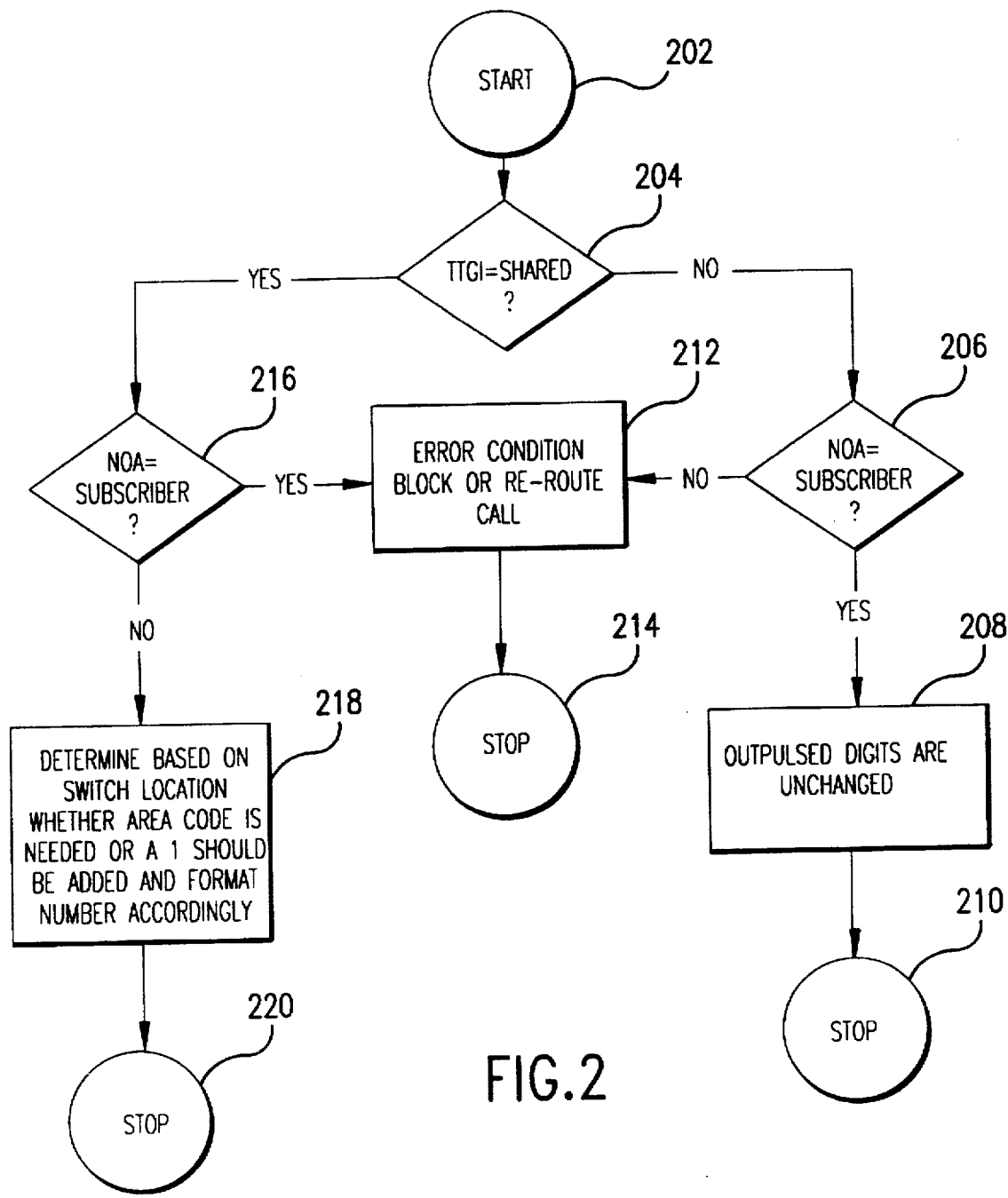
Figure 3:
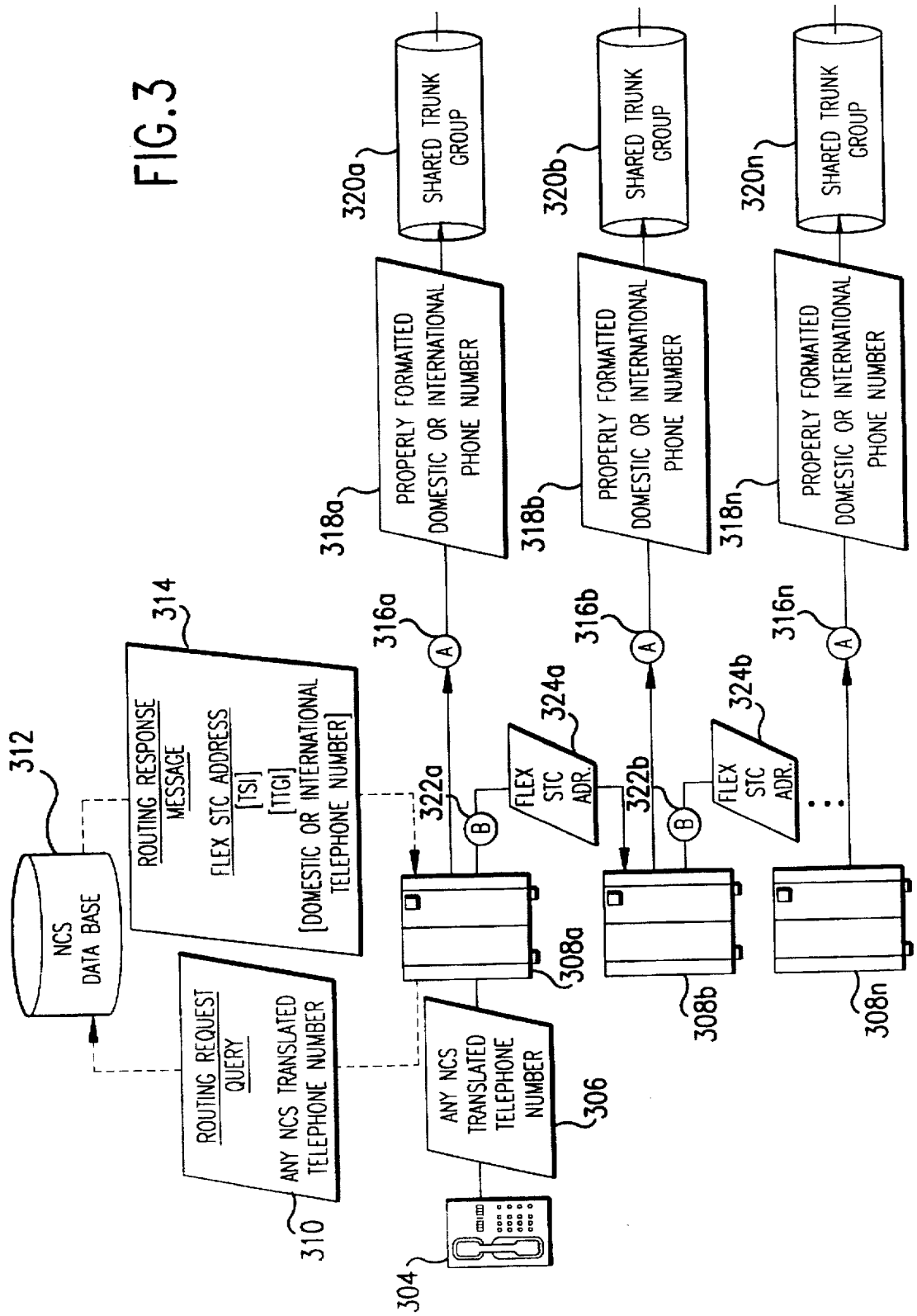
Figure 4:
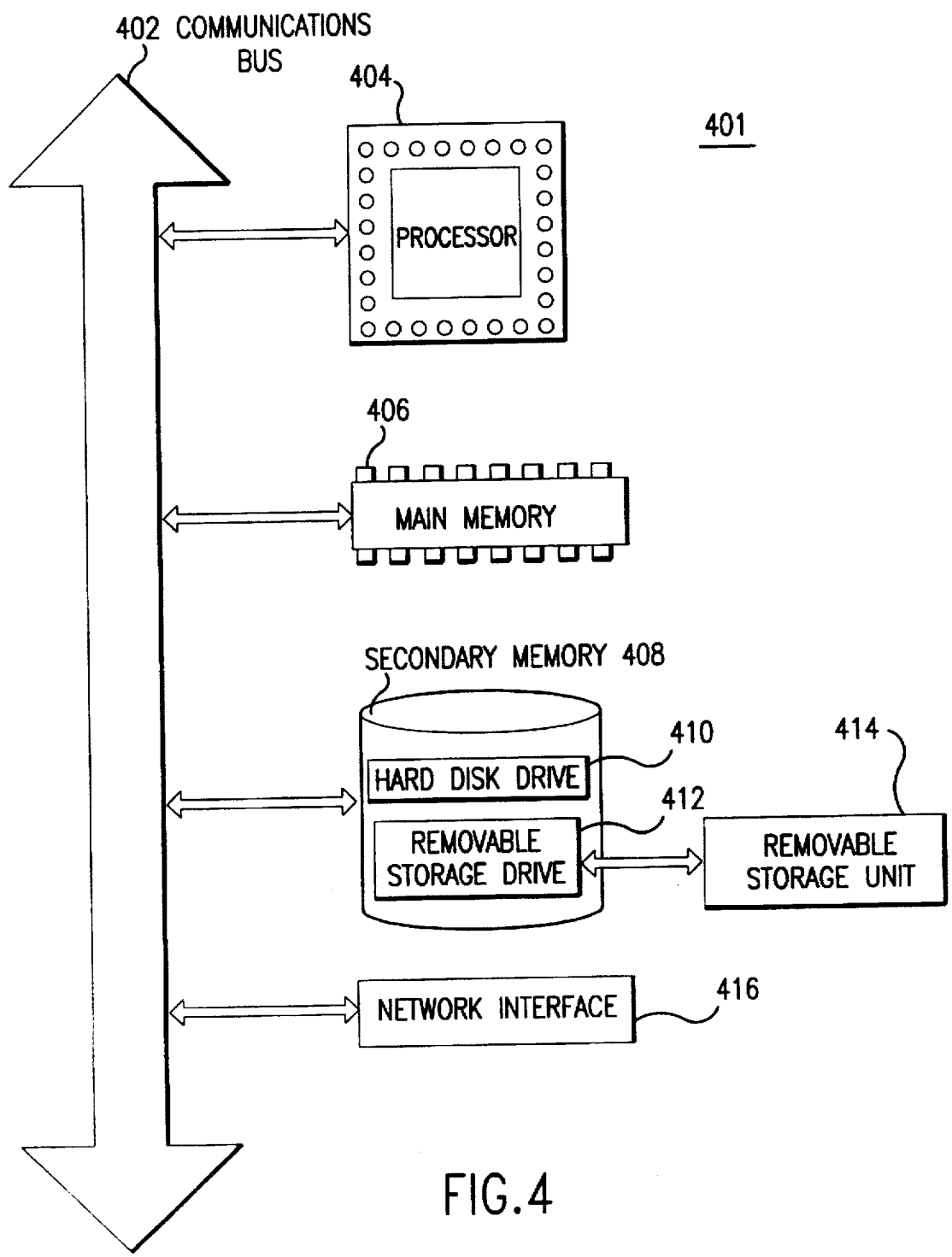

FIG. 1 is a block diagram of flexible direct termination call processing according to an embodiment present invention;

FIG. 2 is a flow chart depicting the preferred operation of the termination switch processing according to the present invention;

FIG. 3 is a block diagram of flexible shared termination call processing according to an embodiment present invention; and FIG. 4 is block diagram of a computer useful for implementing components of the present invention.

FIG. 5 is a flow chart depicting the preferred operation of the receiving switch call processing according to the present invention.

In the drawings, like reference numbers generally indicate identical, functionally similar, and/or structurally similar elements. The drawing in which an element first appears is indicated by the leftmost digit(s) in the reference number.

DETAILED DESCRIPTION OF THE PREFERRED EMBODIMENTS

FIG. 1 is a block diagram depicting flexible direct termination calls (Flex DTC) and FIG. 3 is a block diagram depicting flexible shared termination calls (Flex STC) according to an embodiment of the present invention. Flex DTC processing will now be described in detail, followed by a description of Flex STC processing according to the present invention. Flex DTCs and Flex STCs are collectively referred to herein as Flex TCs (Flexible Termination Calls).

Referring now to FIG. 1, a flexible direct termination call is initiated by a caller dialing a DTC telephone number via a station such as telephone 104, connected to the telephone network. The DTC number 106 is typically a service access code number or other private network service telephone number that is assigned to a subscriber by a telephone service provider (TSP).

The DTC telephone number 106 is routed to the DTC service provider's first switching device 108a by well known routing methods. The receipt of the DTC telephone number by the service provider's switch 108a triggers a translation process 110–114 to occur. Switch 108a initiates a process described below, that translates the DTC telephone number 106 into a Flex DTC address 114. Flex DTC addresses are only meaningful within the service provider's telephone network and have no significance outside the network (i.e., DTC telephone numbers have no Off-Net significance).

In order to better understand the present invention it is useful to describe the relationship between telephone call routing and telephone numbers in general. A standard 7 or 10 digit domestic telephone number (North American Number Plan) comprises routing information including a 3 digit area code (if necessary), a 3 digit local exchange code, and a 4 digit station code. The 3 digit area code identifies a Numbering Plan Area (NPA). Area codes are only necessary when calls traverse more than one NPA. The 3 digit exchange code identifies a particular central office where a plurality of telephone lines are directly connected. The four digit station code identifies a particular telephone line that is connected between the central office and a telephone customer's device such as a telephone, computer, facsimile machine, or PBX.

Therefore, complete routing information is contained in a standard domestic telephone number. This enables a multitude of authorized telephone companies to process and route such calls. A SAC number (a toll free 800 number for example), on the other hand, does not contain routing information directly. The routing information of a SAC number is typically unlisted and known only by the SAC provider. Such information is generally maintained in a data base which is accessible by the service provider's switching devices.

A SAC number is processed by a service provider's switching device and translated into a format that contains required routing information. This format can be for example, a North American Number Plan format (for domestic calls), an IEEE format (for international calls), or a DTC address format for direct termination calls.

Referring back to FIG. 1, the DTC telephone number (which in more general terms, is a SAC or private number), is transported to the service provider's switch 108a. The receipt of the DTC telephone number 106 triggers the switch 108a to initiate a process that translates the DTC telephone number into an address that contains required routing information. Switch 108a sends a routing request query 110 to the Network Control System (NCS)112. The Network Control System 112 is essentially a central computer data base system that is accessible by all switches within the TSP's network.

The NCS 112 responds to the routing request query 110 by sending a routing response message 114 back to the translating switch 108a. The routing response message 114 includes a Flex DTC address. The Flex DTC address 114 includes the following fields: (1) a termination switch identifier (TSI); (2) a termination trunk group identifier (TTGI); and (3) a 1–15 digit number.

Further call processing occurs within the switch 108a, following receipt of the Flex DTC address 114. From this point on in the process, the fact that switch 108a performed the translation process is irrelevant. The call processing that occurs due to the receipt of a Flex DTC address is the same for any switching device that receives such an address, regardless of whether it was sent from the NCS 112, or from another switching device within the network. Such a switching device that receives Flex TCs is referred to herein as the "receiving switch".

Receiving switch call processing will now be described with reference to flowchart 500 in FIG. 5. Since flow chart 500 applies to both Flex DTCs and Flex STCs, the term Flex TC is used throughout to describe both Flex DTC and Flex STC processing. Flexible STC call processing will be discussed later in this disclosure.

In response to the receipt of a Flex TC address, logic within the receiving switch functions as follows. Flowchart 500 begins with step 501, where control immediately passes to step 502. In step 502, the receiving switch determines whether the TSI specified in the Flex TC address matches its own switch identifier. If the TSI does not match the receiving switch identifier, call processing continues with step 508. In step 508, the switching device forwards the Flex TC address via the telephone network, to another switching device according to conventional routing methods and rules. Finally, call processing ends for this receiving switch as indicated by step 510.

If the TSI does match the receiving switch identifier, call processing continues with step 504. This state indicates that the receiving switch is in fact also the termination switch for this particular Flexible Termination call. Thus, the receiving switch continues to process the Flex TC as the termination switch. Termination switch call processing is subsequently described herein with reference to FIG. 2. Finally call processing ends for this receiving switch as indicated by step 506.

Referring back to FIG. 1, if the previously described call processing results in finding that switch 108a is the terminating switch for the current Flex DTC, path A 116a is followed. As indicated by path 118a, all digits that comprise the 1–15 digit field of the Flex DTC address 114 are outpulsed to the dedicated trunk group 120a. The dedicated trunk group 120a is identified by the TTGI field of the Flex DTC address 114 and is directly connected to the termination switch 108a.

If switch 108a is not the terminating switch, path B 122a is followed and the Flex DTC address 124a is forwarded to another switching device 108b, according to well known routing techniques. Switching device 108b is now the new receiving switch and call processing within receiving switch 108b occurs as previously described for receiving switch 108a.

Consequently, if the call processing (as depicted by FIG. 5), within switch 108b results in finding that switch 108b is the terminating switch for the current Flex DTC, path A 116b is followed. As indicated by 118b, all digits that comprise the 1–15 digit field of the Flex DTC address 114 and 124a, are outpulsed to the dedicated trunk group 120b. The dedicated trunk group 120b is identified by the TTGI field of the Flex DTC address and is directly connected to the termination switch 108b.

If switch 108b is not the terminating switch, path B 122b is followed and the Flex DTC address 124b is forwarded to another switching device, according to well known routing techniques. That next switching device now becomes the receiving switch, and the receiving switch call processing as described herein is again repeated.

As should be apparent by the previous example, the receiving switch processing described herein, applies to all switching devices that receive Flex DTC addresses. As FIG. 1 indicates, receiving switch output paths A 116a, 116b and 116n (generally, 116) are functionally identical to each other. Likewise, alternate receiving switch output paths B 122a and 122b (generally 122) are functionally equivalent. Indeed the receiving switch processing as described herein continues until the Flex DTC address 114 reaches the intended termination switch 108a, 108b or 108n (108 generally), as indicated by a match of the receiving switch identifier and the TSI. Once a match occurs the receiving switch 108 functions as the termination switch and processes the Flex DTC along path A 116. Thus the terminating switch 108 terminates the call by outpulsing the 1–15 digit field of the Flex DTC address to the specified dedicated trunk group 120a, 120b or 120n, which is directly connected to the terminating switch 108. In other words a Flex DTC will be processed by each receiving switch in an identical manner. Two transmission paths from each receiving switch are possible (paths A and B). If the TSI matches the receiving switch identifier, the Flex DTC is terminated by the receiving switch via the dedicated access line (identified by the TTGI) connected to the receiving switch. If on the other hand, the receiving switch is not the terminating switch, the Flex DTC is routed to another switch using conventional methods. This process is repeated for each receiving switch until the Flex DTC is received by the terminating switch, where the Flex DTC is finally terminated as described herein.

Additional call processing and error checking occurs at the terminating switch just prior to the termination of Flex DTCs. Such call processing is depicted by the flowchart in FIG. 2, and will now be described in detail. Flowchart 200 begins with step 202, where control immediately passes to step 204. In step 204 the Terminating Trunk Group Identifier (TTGI) is examined to determine whether the TTGI represents a shared trunk group or a dedicated trunk group. If the TTGI represents a dedicated trunk group then step 206 is processed. If the TTGI represents a shared trunk group then step 216 is processed. Steps 216–220 will be examined in detail when flexible shared termination calls (Flex STCs) are discussed subsequently herein.

Continuing now with step 206, a field within the Flex DTC address called "nature of address" (NOA) indicates whether the Flex DTC is destined to a subscriber or not. If the nature of address field indicates that the termination is to a subscriber, step 208 is processed. In step 208 all of the digits that comprise the 1–15 digits field of the Flex DTC address are outpulsed to the DAL, whose identifier matches the TTGI field of the Flex DTC address.

The conventional requirement of accessing a data base at the termination switch to determine the number of digits to outpulse to the DAL, is no longer required by the present invention. All digits that are included in the Flex DTC address are outpulsed to the DAL. The 1–15 digit field of the Flex DTC address contains the correct digits as a result of the NCS translation phase 110–114. Thus the present invention allows for the transportation of only those digits that are required to be outpulsed to terminate the Flex DTC. This results in an increase in efficiency over the conventional method because network throughput is reduced by not having to send superfluous digits over the telephone network. Furthermore by processing this parameter in the NCS data base 112, different values may be specified for each DTC telephone number. The conventional method only permits a single parameter to be specified for the plurality of DTC telephone numbers that terminate at a specific termination trunk group (120a for example). Finally, by maintaining this parameter in a centralized NCS data base 112, instead of being distributed among a plurality of termination switches (108a, 108b . . . 108n), maintenance and updates are achieved more efficiently. Referring back to FIG. 2, if the nature of address field indicates that the termination is not a subscriber in step 206, step 212 is processed and the call is blocked or re-routed. This is an error condition because in order to get to step 206, step 204 must have indicated that the call was destined to a dedicated trunk group. A call destined to a dedicated trunk group is by definition a call destined to a subscriber. Furthermore, the 1–15 digits that are destined to a DAL has no significance outside the service provider's telephone network and it would make no sense to outpulse such a number to a shared trunk group. Therefore the call is blocked or re-routed in step 212 and the flowchart is complete as step 214 indicates.

Flexible shared termination calls (Flex STCs) will now be discussed. As previously stated, an additional feature of the present invention is to apply the routing flexibility that was previously associated only with direct termination calls, to shared termination calls. Flex STCs are processed using the identical methods and techniques as Flex DTCs.

A shared termination call terminates at a shared trunk group. A shared trunk group is a group of transmission lines that are shared by many telephone company customers. A shared termination trunk group as discussed herein, is connected between a service provider's switching device and a device outside the TSP's telephone network. For example if the TSP is a long distance carrier, a shared termination call may terminate at a shared trunk group connected between the TSP's terminating switch and a local exchange carrier's (LEC's) central office, or a foreign carrier's switching device.

Consequently, when flexible shared termination calls are translated into Flex STC addresses the translated address must contain a telephone number that has Off-Net significance. In other words, all Flex STC addresses include a telephone number that conforms to known routing standards such as the North American Number Plan for domestic calls or the IEEE format for international calls.

However, in addition to the standard routing information, a Flex STC address, like a Flex DTC address, includes termination switch and termination trunk group identifiers. The additional routing information allows greater flexibility by enabling a service provider to route calls more effectively to particular shared termination trunk groups. This is desirable because a particular shared trunk group may have certain characteristics that can be utilized by the telephone service provider in order to better serve its customers. For example, the present invention provides the flexibility to route a customer's high speed data call to a particular shared trunk group that is most suitable for high speed data calls. Other examples of using this increased flexibility include routing international calls to a specific carrier, and routing wideband calls through wideband-capable trunk groups.

Referring now to FIG. 3, a flexible shared termination call is initiated by a caller dialing a Flex STC number via a station, such as a telephone 304 connected to the telephone network. The Flex STC number 306 can be any telephone number assigned by the service provider that by design, triggers a translation process to take place by the switch 308a. The receipt of the Flex STC telephone number 306 triggers the switch 308a to initiate a process that translates the STC telephone number into an address that contains routing information. The switch 308a, sends a routing request query 310 to the Network Control System (NCS) 312.

The NCS 312 responds to the routing request query 310 by sending a routing response message 314 back to the translating switch 308a. The routing response message 314 includes a Flex STC address. The Flex STC address 314 includes the following fields: (1) a termination switch identifier (TSI); (2) a termination trunk group identifier (TTGI); and (3) a domestic or international telephone number.

Further call processing occurs within the switch 308a following receipt of the Flex STC address 314. The call processing that occurs due to the receipt of a Flex STC address is the same for any switching device that receives such an address, regardless of whether it was sent from the NCS 312, or from another switching device within the network. Such a switching device is referred to as a receiving switch. Receiving switch call processing will now be described with reference to flowchart 500 in FIG. 5.

In response to the receipt of a Flex TC address, logic within the receiving switch functions as follows. Flowchart 500 begins with step 501, where control immediately passes to step 502. In step 502, the receiving switch determines whether the TSI specified in the Flex TC address matches its own switch identifier. If the TSI does not match the receiving switch identifier, call processing continues with step 508. In step 508, the switching device forwards the Flex TC address via the telephone network, to another switching device according to conventional routing methods and rules. Finally, call processing ends for this receiving switch as indicated by step 510.

If the TSI does match the receiving switch identifier, call processing continues with step 504. This state indicates that the receiving switch is in fact also the termination switch for this particular Flexible Termination call. Thus, the receiving switch continues to process the Flex TC as the terminating switch. Finally call processing ends for this receiving switch as indicated by step 506.

Referring back now to FIG. 3, if the previously described call processing within switch 308a, results in finding that switch 308a is the terminating switch for the current Flex STC, path A 316a is followed. As indicated by path A 316a, a properly formatted domestic or international telephone number 318a which is derived from the Flex STC address 314, is outpulsed to the shared trunk group 320a. The shared trunk group 320a is identified by the TTGI field of the Flex STC address 314 and is directly connected to the termination switch 308a.

If switch 308a is not the terminating switch, path B 322a is followed and the Flex STC address 324a is forwarded to the next switching device 308b, according to well known routing techniques. Switching device 308b, now becomes the receiving switch and the receiving switch call processing as described herein is repeated for switch 308b.

Consequently, if the call processing within switch 308b (as depicted by the flowchart in FIG. 5), results in finding that switch 308b is the terminating switch for the current Flex STC, path A 316b is followed. A properly formatted domestic or international telephone number 318b which is derived from the Flex STC address 314 and 324a, is outpulsed to the shared trunk group 320b.

If switch 308b is not the terminating switch, path B 322b is followed and the Flex STC address 324b is forwarded to the next switching device. The next switching device now becomes the receiving switch, and the receiving switch call processing as described herein is again repeated.

Additional call processing and error checking occurs within terminating switches just prior to the termination of Flex STCs. Termination switch call processing uses the same logic as was previously discussed for Flex DTCs, with reference to the flowchart in FIG. 2. The logic path for termination call processing relevant to Flex STCs will now be discussed.

Flowchart 200 begins with step 202, where control immediately passes to step 204. In step 204 the Terminating Trunk Group Identifier (TTGI) is examined to determine whether the TTGI represents a shared trunk group or a dedicated trunk group. If the TTGI represents a shared trunk group then step 216 is processed.

In step 216, the nature of address field is examined. This field may have the value of "subscriber", "international", or "national". If the NOA field indicates either national or international (i.e., not a subscriber), step 218 is processed.

In step 218 termination switch call processing logic determines which digits that comprise the national or international phone number are outpulsed into the shared trunk group. This determination is based on well known routing rules and considers factors such as the NPA of the termination switch as compared with the NPA of the domestic telephone number. The result is to determine factors such as whether a "1" needs to be added or whether the area code is necessary. The final result of step 218 is a properly formatted telephone number that is outpulsed from the termination switch to the shared trunk group as identified by the TTGI.

If the nature of address field indicates that the termination is a subscriber in step 216, step 212 is processed and the call is blocked or re-routed. This is an error condition because in order to get to step 216, step 204 must have indicated that the call was destined for a shared trunk group. A call destined for a shared trunk group is by definition a call destined to a non-subscriber. Therefore, such a call is blocked or re-routed in step 212 and the flowchart is complete as step 214 indicates.

In one embodiment, devices 108, 118, 112, and 120 may each be embodied in a general computer system. An exemplary computer system 401 is shown in FIG. 4. The computer system 401 includes one or more processors, such as processor 404. The processor 404 is connected to a communication bus 402.

The computer system 401 also includes main memory 406, preferably random access memory (RAM), and a secondary memory 408. The secondary memory 408 includes, for example, a hard disk drive 410 and/or a removable storage drive 412, representing a floppy disk drive, a magnetic tape drive, a compact disk drive, etc. The removable storage drive 412 reads from and/or writes to a removable storage unit 414 in a well known manner.

Removable storage unit 414, also called a program storage device or a computer program product, represents a floppy disk, magnetic tape, compact disk, etc. As will be appreciated, the removable storage unit 414 includes a computer usable storage medium having stored therein computer software and/or data. Computer programs (also called controllers ) are stored in main memory and/or secondary memory 408. Such computer programs, when executed, enable computer system 401 to perform the features of the present invention discussed herein. In particular, the computer programs, when executed enable processor 404 to perform the features of the present invention. Accordingly, such computer programs represent controllers of computer system 401.

The computer system 401 also includes a network interface 416. Network interface 416 provides the necessary hardware and software required to enable two-way communications between computer system 401 and other devices attached to the telephone network.

In another embodiment, the invention is directed to a computer program product comprising a computer readable medium having control logic (computer software) stored therein. The control logic, when executed by processor 404, causes processor 404 to perform the functions of the invention as described herein.

In another embodiment, the invention is implemented primarily in hardware using, for example, a hardware state machine. Implementation of the hardware state machine so as to perform these functions described herein will be apparent to persons skilled in the relevant art(s).

Example of a typical embodiment

Using a typical embodiment of the present invention as an example, the following section describes areas within a telephone network that should be considered when implementing the present invention. The purpose of this section is to generally describe particular areas within a telephone network that may be affected by implementations of the present invention. Other particular implementations of the present invention as described herein will be apparent to persons skilled in the pertinent art(s). The terms "destination" and "termination" switch should be regarded as synonymous and are used interchangeably herein. The present invention is an expansion of existing routing methods and does not require architectural changes to the telephone network.

Call Processing

Changes in call processing used to support the present invention are broken down into the following sections: domestic switch call processing; NCS translation switch call processing; and gateway switch call processing. The translating domestic switch launches routing request queries in the same manner as used in the conventional method. For flexible termination calls (Flex DTCs and Flex STCs), the NCS provides the domestic switch with a corresponding address and supporting Action Code, which defines the type of destination routing address. Upon receipt of a routing response message from the NCS, a domestic switch terminates the call to a dedicated or shared trunk group, or routes the call to another switch on a Signaling System 7(SS7) Inter-machine Trunk (IMT).

If a switching device receives a Flex TC from an SS7 IMT, it will use information received in the SS7 Initial Address Message (IAM), to properly terminate the call to a dedicated or shared trunk group, or to another SS7 IMT. Similarly, gateway switches process Flex TC addresses received on an SS7 IMT to terminate such calls to shared or dedicated international trunks.

Domestic Switch Call Processing

Domestic switches use existing call processing methods to process the originating portion of the calls. If a call is received that requires destination address translation (e.g. a SAC, domestic, or international call), the translation switch formulates the appropriate routing request query message and sends it to the NCS. The NCS may send back a routing response message that contains a Flex TC address. The following sections describe the call processing within the various domestic switches used to process Flexible termination calls of the present invention.

Translating switch

The translating switch which launches the NCS query to determine destination address translations is usually, but not always, the originating service provider's switch. The translating switch which launches the query receives the Flex TC address in a routing response message from the NCS. The routing response may for example, contain the following information:

| Application Data Field (ADF) Parameter | Range | Value |
| --- | --- | --- |
| Destination Switch ID | 000–999 | As Appropriate |
| Terminating Trunk Group Identifier | 0000–8191 | As Appropriate |
| Subsequent Address | 1–15 Digits | As Appropriate |
| Nature of Subsequent Address | -Subscriber (1) -National (3) -International (4) | As Appropriate |
| Action Code | 0–27 | 50 (Flex DTC, Dedicated-Overflow N/A) 51 (Flex DTC, Dedicated-Overflow Allowed) 55 (Flex STC, Shared - Overflow N/A) 56 (Flex STC, Shared - Overflow Allowed) |

The translating switch checks the Subsequent Address, Nature of Address and the Action Code in order to determine if the call should progress. If the Nature of Subsequent Address=1 (Subscriber), and the Action Code=55 or 56 (Shared Termination), the switch blocks the call. All other combinations are allowed to route as described by the process in FIG. 1 and the flowchart in FIG. 5.

If the Destination Switch ID (DSID) matches the switch's own switch ID, the switch attempts to route the call to the terminating trunk group as provided by the Terminating Trunk Group Identifier. If the Destination Switch ID does not match the switch's own switch ID, it will attempt to route the call using the existing routing tables to the destination switch. The switch will formulate an SS7 Integrated Services User Part (ISUP) IAM using the following chart to map the ADF parameters into SS7 ISUP Parameters:

| ADF Parameter | Value | SS7 Parameter | Value |
| --- | --- | --- | --- |
| Destination Switch ID | 000–999 | Generic Digits ($10101_2$) | DSID + TTG |
| Terminating Trunk Group Identifier | 0000–8191 | | |
| Subsequent Address | 1–15 Digits | Called Party Number | 1–15 Digits |
| Nature of Subsequent Address | Subscriber (1) National (3) International (4) | Called Party Number NOA | Subscriber (1) National (3) International (4) |
| Action Code | 50 | Forward Call Special | 45 |
| | 55 | | 45 |
| | 51 | Information (FCSI) Digits | 46 |
| | 56 | | 46 |

Tandem Switch

If a switch receives an SS7 IAM with a Forward Call Special Information (FCSI) Digits value of 45 or 46, indicating a Flex TC call, and the DSID received in the Generic Digits parameter (coded as $10101_2$-DSID+TTG) does not match the switch's own NCS Switch ID, the switch acts as a tandem Switch and attempts to route the call to the destination Switch. The switch will use conventional routing tables to select a terminating SS7 IMT trunk group, and will pass all SS7 information to the Terminating SS7 IMT Trunk.

Destination Switch

If the switch receives a DSID that matches it's own NCS Switch ID from the NCS in an ADF message, or from an SS7 IAM message (FCSI Digits=45 or 46) in the Generic Digits parameter, the switch uses conventional terminating routing tables to attempt to route the call to a terminating trunk group.

ISN/Bridging Switch

If the Integrated Services Network (ISN) processes a call that requires destination address translation, the ISN formulates the appropriate Call Procedure Request Message to send to the NCS. If the NCS sends back a response message which contains a Flex TC address, the ISN platform passes the DSID+TTG in the Generic Digits parameter, Called Party Number and Action Code back to the bridging switch in an SS7 Release Line Trunk (RLT) message. The bridging Switch is enabled to receive the Action Codes of 50, 51, 55 and 56 from the ISN, map them to the proper FCSI Digits values, and perform applicable routing.

Flexible Direct Termination Processing

Current Direct Termination Processing

As stated, conventional DTC call processing and routing supports the transportation of 7 or 10 digits of information, which is outpulsed to a dedicated terminating trunk. The SS7 ISUP parameters that are involved are shown below, where NX... are the digits to be outpulsed (N=2–9, X=0–9), SSS is the NCS Switch ID, and TTTT is the Terminating Trunk Group Identifier:

| SS7 Parameter | 7D DTC | 10D DTC |
| --- | --- | --- |
| Called Party Number | NXXXXXX-SSS-TTTT | NXXXXXXXXX-SSS-TTTT |
| Called Party Number NOS | Subscriber (1) | Subscriber (1) |
| Generic Digits (DSID + TTG) | N/A | N/A |
| FCSI Digits | 31, 32, 41, 42 | 33, 34, 43, 44 |

Calls are routed to the Destination switch, which selects the terminating trunk group, and outpulses the required number of subsequent address digits from the Called Party Number parameter. The subsequent address is an On-Net Address for a particular customer, and outpulsed on the terminating trunk without any address checking.

Flexible Termination Processing

Flex TC call processing and routing supports the transportation of, for example, 1 to 15 digits of information, to be outpulsed to the terminating trunk. The SS7 ISUP parameters that are involved are shown below, where NX . . . are the digits to be outpulsed (N=2–9, X=0–9), SSS is the NCS Switch ID, and TTTT is the Terminating Trunk Group Identifier:

| SS7 Parameter | 7D DTC | 10D DTC | Flex TC |
|---|---|---|---|
| Called Party Number | NXXXXXX-SSS-TTT | NXXXXXXXXX-SSS-TTTT | X to XXXXXXXXXXXXXXX |
| Called Party Number NOA | -Subscriber (1) | -Subscriber (1) | -Subscriber (1) -National (3) -International (4) |
| Generic Digits (DSID + TTG) | N/A | N/A | SSS-TTTT |
| FCSI Digits | 31, 32, 41, 42 | 33, 34, 43, 44 | 45 or (46) |

The present invention supports flexible termination calls that terminate at dedicated and shared trunk groups. The calls are routed to the destination switch, which selects the terminating trunk group, and outpulses the required digits from the Called Party Number parameter. Dedicated terminating trunks are able to outpulse Called Party Numbers with a NOA of 1, 3, or 4, and shared terminating trunks are able to process Called Party Numbers with a NOA of only 3 or 4.

Terminating To Dedicated Trunks

The present invention enables the NCS to send the correct number of digits to be outpulsed in the Called Party Number parameter, and the terminating switch will not need a trunk group "Number of Digits To Outpulse" parameter. If the switch receives a Flex TC address (FCSI=45 or 46) and the trunk group is a dedicated inband trunk group, the switch will over-ride the terminating trunk group "Number of Digits To Outpulse" parameter, and outpulse all of the digits from the SS7 Called Party Number parameter. This allows variable length outpulsing on the terminating trunk to be controlled by the NCS. If the terminating Trunk Group is SS7 or ISDN, the entire Calling Party Number is transported.

If an Enhanced Overflow feature is available, Flex TC calls can be routed to a particular destination switch/trunk, and then released back if that switch/trunk is not available. This will allow the terminating switch to route to one trunk group in the terminating routing table, instead of a list of trunks. The NCS will then have the capability to select a particular destination switch/trunk group, and control the number of digits to be outpulsed to the trunk group.

Terminating To Shared Trunks

As previously described, conventional direct termination call processing to dedicated trunks supports the outpulsing of digits to a terminating trunk, the outpulsed number is just treated as an On-Net Address, and is outpulsed without any address checking.

For Flex STC calls to shared trunk groups, the Called party Number will be a Destination Address and the Called Party Number Nature of Address will be "National" or "International". Calls with NOA of "Subscriber" are not allowed on Shared Terminating trunk groups because the Called Party Number is an On-Net address, and has no Off-Net significance.

If the trunk group is Shared and the Calling Party Number Nature Of Address is "3" (National) or "4" (International), the switch will consider the Terminating Trunk Group information to determine which digits need to be outpulsed. For instance, if a Flex STC is destined for a local trunk group that terminates within the same local access and transport area (LATA), and the Called Party Number is 214-555-1212 (NOA=3), the switch only outpulses 555-1212. If the same Called Party Number was destined for a trunk group outside the LATA, the switch would outpulse 1+214-555-1212. If the terminating trunk type were an IMT, the entire Called Party Number is transported. Further checking is done at the terminating switch to insure that a Calling Party Number with a NOA of "Subscriber" is not outpulsed to a Shared Trunk Group.

This increased functionality of the present invention may be used whenever a call needs to be directed to a particular shared terminating trunk group, and may be used in special cases where normal routing needs to be by-passed. Any type of call could use this routing method as long as the NCS could provide translation capabilities.

NCS Translation Processing

Upon receipt of a Call Procedure request message from a translating switch, the NCS performs conventional number screening and address translations. The NCS returns a destination address back to the switch in a Routing Response Message. If the Routing Response Message contains a Flex TC address the message will contain the following parameters:

| Parameter | Range | Value |
|---|---|---|
| Destination Switch ID | 000–999 | As Appropriate |
| Terminating Trunk Group | 0000–8191 | As Appropriate |
| Subsequent Address | 1–15 Digits | As Appropriate |
| Nature Of Subsequent Address | -Subscriber (1) -National (3) -International (4) | As Appropriate |
| Action Code | 0–127 | 50 (Flex DTC, Dedicated - Overflow N/A) 51 (Flex DTC, Dedicated- Overflow Allowed) 55 (Flex DTC, Shared - Overflow N/A) 56 (Flex DTC, Shared - Overflow Allowed) |

International Gateway Switch Processing

International Gateway Switches support the same termination processing as described herein, under the sections entitled "Termination to Dedicated Trunks" and "Terminating to Shared Trunks". Flexible TC addresses will be transported from the domestic switch to the International Gateway switch, and will use two formats:

1) Flexible shared termination calls
   Destination Trunk Group is a shared trunk group Called Party Number is an international number
Called Party Number Nature Of Address is "International"

2) Flexible direct termination calls
Destination Trunk Group is a dedicated trunk group
Called Party Number is a private number
Called Party Number Nature Of Address is "Subscriber" or "International"

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method for processing and routing termination calls, each having a termination telephone number, comprising the steps of:

(1) receiving a termination telephone number at a telecommunication switch;

(2) sending said termination telephone number to a computer data base system in response to receiving the termination telephone number;

(3) translating at said computer data base system, the termination telephone number into a termination routing address, wherein said translating step includes providing to the telecommunication switch a termination switch identifier, at least one digit to be out pulsed from a receiving switch having a switch identifier that corresponds to said termination switch identifier, and a termination trunk group identifier;

(4) sending said termination routing address to the telecommunication switch, thereby causing the telecommunication switch to process the termination call as a receiving switch;

(5) receiving said termination routing address at a receiving switch having a receiving switch identifier;

(6) comparing the receiving switch identifier and said termination switch identifier in response to receiving said termination routing address; and (7) outpulsing said at least one digit from the receiving switch to a termination trunk group having said termination trunk group identifier, if the receiving switch identifier matches said termination switch identifier.

2. The method of claim 1, further comprising the step of:

(8) routing said termination routing address to a next receiving switch if the receiving switch identifier does not match said termination switch identifier, and thereafter performing at least steps (5)–(6).

3. The method of claim 1 wherein said termination trunk group identifier is a dedicated trunk group identifier.

4. The method of claim 3, wherein said at least one digit is determined from a predefined specification, stored in said computer data base system, comprising one or more predefined digits to be out pulsed to a dedicated trunk group having a trunk group identifier that corresponds to said termination trunk group identifier.

5. The method of claim 4, wherein said predefined digits may be specified for each said termination telephone number.

6. The method of claim 1 wherein said termination trunk group identifier is a shared trunk group identifier.

7. The method of claim 6, wherein said at least one digit comprises a national telephone number.

8. The method of claim 6, wherein said at least one digit comprises an international telephone number.

9. In a telecommunications system having means for originating a termination call and at least one termination trunk group, apparatus for processing and routing termination calls, each having a termination telephone number, to the appropriate termination trunk group, comprising:

a telecommunications switch for receiving the termination call;

a data base system coupled to said telecommunications switch for translating the termination telephone number into a termination routing address in response to receipt of the termination telephone number, wherein said termination routing address includes a termination switch identifier, at least one digit to be out pulsed from a receiving switch having a switch identifier that corresponds to said termination switch identifier, and a termination trunk group identifier;

a receiving switch having a receiving switch identifier for receiving said termination routing address;

comparing means coupled to said receiving switch for comparing the receiving switch identifier and said termination switch identifier; and means coupled to said comparing means for out pulsing said at least one digit from said receiving switch to the appropriate termination trunk group when the receiving switch identifier matches said termination switch identifier.

10. The apparatus of claim 9, further comprising:

means coupled to said comparing means for routing said termination routing address to a next receiving switch when said receiving switch identifier does not match said termination switch identifier.

11. The apparatus of claim 9, wherein said termination telephone number is input to said data base system and said termination routing address is output from said data base system.

12. The apparatus of claim 9, wherein said termination trunk group is a dedicated trunk group.

13. The apparatus of claim 12, wherein said at least one digit is determined from a predefined specification, stored in said data base system, comprising one or more predefined digits to be out pulsed to the dedicated trunk group.

14. The apparatus of claim 13, wherein said predefined digits may be specified for each said termination telephone number.

15. The apparatus of claim 9, wherein said termination trunk group is a shared trunk group.

16. The apparatus of claim 15, wherein said at least one digit comprises a national or international telephone number.

* * * * *